United States Patent Office 3,057,938
Patented Oct. 9, 1962

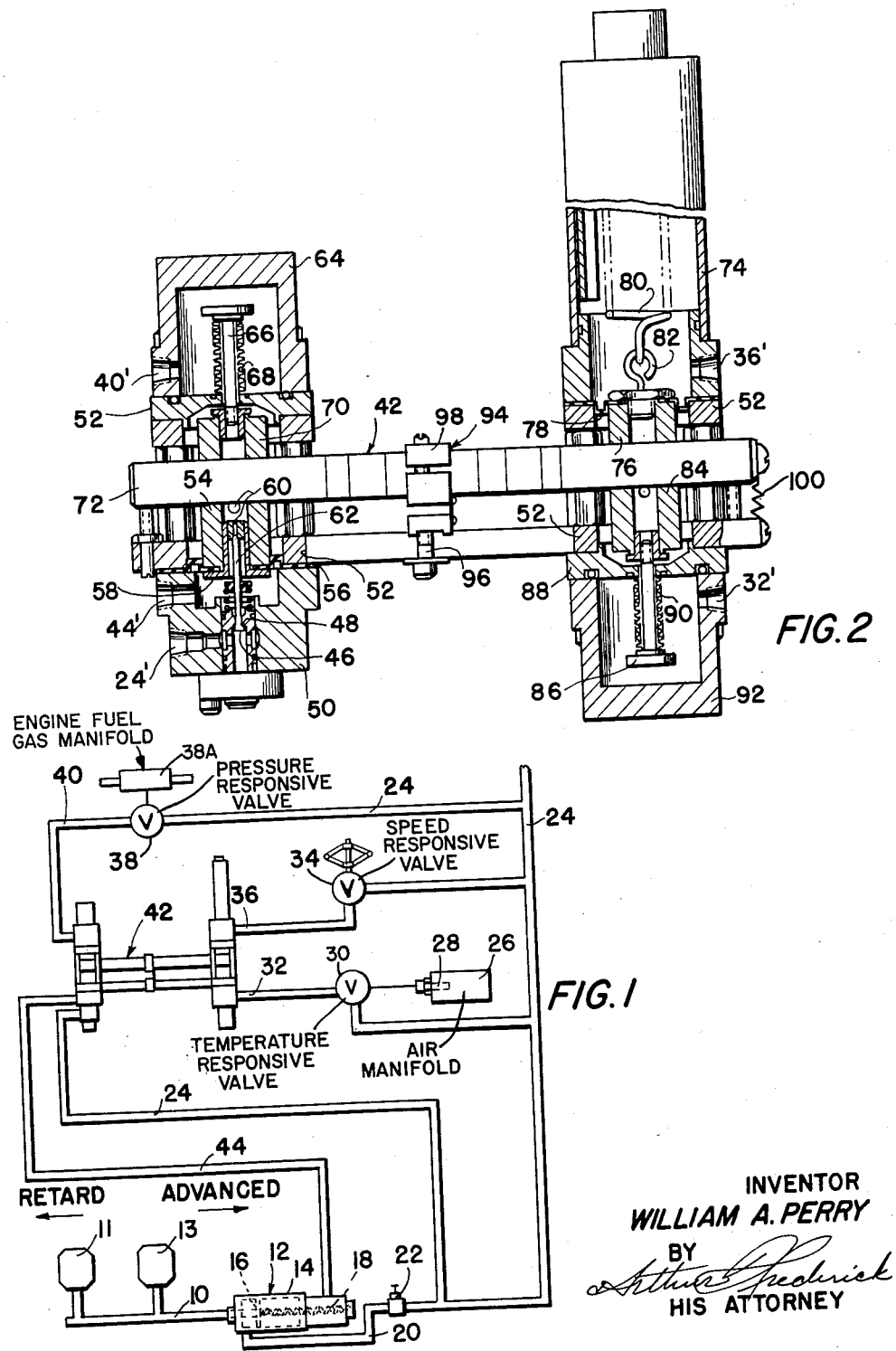

3,057,938
SPARK IGNITION CONTROL FOR GAS ENGINES
William A. Perry, Corning, N.Y., assignor to Ingersoll-Rand Company, New York, N.Y., a corporation of New Jersey
Filed Aug. 28, 1961, Ser. No. 134,207
3 Claims. (Cl. 123—149)

This invention relates to spark ignited internal combustion engines and particularly a system of control therefor.

This invention is particularly adapted for use with a gas engine operating on a four stroke cycle and supercharged by a turbine actuated by the engine exhaust.

In the operation of engines of this character, the highest efficiency is obtainable by the use of high compression pressures and the critical factors in such operation are the speed of the engine, the temperature of the air in the intake manifold, and the engine torque of which fuel gas manifold pressure is a function. To maintain the best efficiency variations in these factors necessitate adjustment of the spark ignition timing, and it is for this purpose that this apparatus is designed.

It is accordingly an object of this invention to provide a control apparatus for adjusting the timing of ignition for such an engine which is relatively simple, easy to adjust, and reliable in operation.

Further objects of the invention and their advantages will be in part obvious and in part pointed out hereinafter.

The drawing illustrates a preferred embodiment of the invention as applied to apparatus for controlling a spark controlled supercharged gas engine and includes FIGURE 1, a diagrammatic representation of the complete system of regulation, and FIG. 2, a longitudinal section of the controlling valve and its operating mechanism.

Referring to the drawing the complete control system is illustrated in FIGURE 1 in which is shown a pair of magnetos 11 and 13 for supplying the ignition, which magnetos are adapted to be retarded and advanced as to the timing by the piston rod 10 of a servo motor 12 which may be of any well known construction. In this instance, the servo motor consists of a cylinder 14 into which the piston rod 10 extends for connection with a piston 16 biased in one direction by a spring 18 and normally balanced by air pressure supplied through a pipe connection 20 associated with a pressure regulator 22 in a supply line 24 from a suitable constant pressure air supply of a compressor (not shown).

The engine air manifold 26 is provided with a temperature senser 28 which controls a suitable temperature controlled valve 30 by which air from the constant pressure air supply pipe 24 is modified to be delivered into a conduit 32. Likewise an engine speed controlled valve 34 also associated with the constant pressure air supply pipe 24 is adapted to deliver air at modified pressure into an air line 36. Additionally the pressure in the engine fuel gas manifold 38A is adapted to operate a pressure valve 38 to deliver air at modified pressure from the air supply line 24 to a conduit 40 in accordance with the manifold pressure variations.

The varied pressures delivered to the conduits of air lines 32, 36 and 40 are introduced into a valve, usually known as a "totalizer," indicated at 42, the details of which are shown in FIG. 2. Totalizer 42 is adapted to feed air at a modified pressure into a conduit 44 leading to cylinder 14 to actuate piston 16 against the pressure on the opposite sides of piston 16 and with the assistance of spring 18 for retarding the timing of the magnetos or to advance them as the case may be.

The modified pressure for air line 44 is controlled by a valve 46 cooperating with a valve seat 48. Valve 46 and its seat 48 are mounted in a head member 50 supported by a frame 52 and provided with an inlet hole 24' for attachment to air line 24, and a threaded aperture 44' for connection to the conduit 44. Motion of valve 46 is effected by a plunger 54 reciprocatory in member 50 and sealed therein by a diaphragm 56. Plunger 54 carries a bushing 58 having an escape passage 60 controlled by the stem 62 of valve 46 so that when plunger 54 rises due to pressure within head 50 air under pressure will escape to atmosphere by way of port 60.

Also mounted on the base 52 is a cylinder 64 having a threaded aperture 40' for connection to the air line 40 from fuel gas pressure valve 38. Within cylinder 64 is mounted a plunger 66 surrounded by a collapsible sealing tube 68 to prevent escape of fluid from the interior of cylinder 64. Plunger 66 is adapted to actuate a plunger 70 in alignment with plunger 54 and to exert pressure thereto by way of a lever beam 72 interposed therebetween. Thus fuel gas pressures exerted at the valve 38 are adapted to influence the motion of valve 46.

Variations in pressure in the air line 36 are transmitted to totalizer 42 by way of a cylinder 74, also mounted on frame 52. Thus cylinder 74 is provided with a threaded hole 36' for connection with line 36 and the pressure introduced thereby is exerted on a plunger 76 mounted in frame 52 on a diaphragm 78. The pressure within cylinder 74 is partially counterbalanced by a spring 80 mounted within cylinder 74 and attached by a ring 82 to plunger 76.

Opposed to plunger 76 is an additional plunger 84 upon which is mounted a stem 86 sealingly mounted upon a base 88 carried by frame 52. The expansible cylinder 90 encircling stem 86 provides a seal at the base 88 attached to frame 52. A cylinder 92 encloses the stem 86 and is provided with a tapped hole 32' for attachment with the air line 32 from the temperature control valve 30. Lever 72 is interposed between plungers 76 and 84 and is adapted to be moved by the differential pressures acting thereupon. Intermediate its ends, lever 72 is provided with a fulcrum member 94 attached to base 52 by clamp 96 and to lever 72 by a clamp 98. Upon the positioning of fulcrum 94 depends the degree of influence which the actuating forces of plungers 76 and 84 will exert upon valve 46 as compared with the actuating forces of plungers 70 and 54. A centralizing or balancing spring 100 is provided at an end of lever 72, spring 100 being attached to frame 52.

In operation it will be seen that upon increase in speed of the engine there will be a tendency of the lever 72 to rise to reduce the pressure in line 44 which would accordingly tend to advance the timing of the magneto ignition since pressure introduced in line 20 would overbalance the pressure of spring 18 and the pressure introduced at air line 44 while an increase in the gas fuel pressure and the air intake temperature as evidenced that the temperature senser 28 will tend to counteract such spark advance. As is well understood, the increase in engine torque and a corresponding increase in fuel gas pressure or a high compression temperature due to high air manifold temperatures have a tendency to produce premature detonation which accompanies loss of efficiency and is therefore undesirable. Accordingly, to maintain the maximum operating efficiency, it is necessary to retard the spark timing as either the engine torque or the air manifold temperature increases. A proper adjustment of these factors is afforded by the adjustability of fulcrum 94.

Thus by the above construction are accomplished among others the objects before referred to.

I claim:

1. Control apparatus for a spark ignition gas engine having a fuel gas manifold and an air intake manifold comprising a constant pressure air supply, a servo motor, a magneto provided with advance and retard means operable by said servo motor, a conduit to supply pressurized air from said air supply to actuate said servo motor, a valve to control the pressure of the air in said conduit, and means to actuate said valve including separate pressure controlling valves associated with said constant pressure supply and controlled by the engine speed, pressure in the gas manifold, and the temperature in the air manifold, to supply air separately at pressures variable in accordance therewith, a lever for actuating said conduit pressure controlling valve, and plungers jointly acting on said lever and individually controlled by said separate air supplies to actuate said lever.

2. Control apparatus as set forth in claim 1 in which said lever is provided with a fulcrum adjustable lengthwise thereof.

3. Control apparatus as set forth in claim 2 in which is provided a spring for balancing said lever about said fulcrum.

No references cited.